(12) United States Patent
Courchene et al.

(10) Patent No.: US 10,900,177 B2
(45) Date of Patent: Jan. 26, 2021

(54) OXIDIZED CELLULOSE CONTAINING PACKAGING MATERIALS

(71) Applicant: GP Cellulose GmbH, Zug (CH)

(72) Inventors: Charles E. Courchene, Snellville, GA (US); Ernest R. Fish, Lawrenceville, GA (US); Arthur J. Nonni, Peachtree City, GA (US); Mechelli R. Campbell, Germantown, TN (US)

(73) Assignee: GP CELLULOSE GMBH, Zug (CH)

( * ) Notice: Subject to any disclaimer, the term of this patent is extended or adjusted under 35 U.S.C. 154(b) by 66 days.

(21) Appl. No.: 16/306,572

(22) PCT Filed: May 25, 2017

(86) PCT No.: PCT/US2017/034463
§ 371 (c)(1),
(2) Date: Dec. 1, 2018

(87) PCT Pub. No.: WO2017/210079
PCT Pub. Date: Dec. 7, 2017

(65) Prior Publication Data
US 2019/0226153 A1    Jul. 25, 2019

Related U.S. Application Data

(60) Provisional application No. 62/344,578, filed on Jun. 2, 2016.

(51) Int. Cl.
*D21H 27/10* (2006.01)
*D21C 9/02* (2006.01)
(Continued)

(52) U.S. Cl.
CPC ............... *D21H 27/10* (2013.01); *D21C 9/02* (2013.01); *D21C 9/163* (2013.01); *D21H 11/04* (2013.01);
(Continued)

(58) Field of Classification Search
None
See application file for complete search history.

(56) References Cited

U.S. PATENT DOCUMENTS

2003/0024661 A1* 2/2003 Shore .................... A61L 15/28
162/9
2012/0175073 A1* 7/2012 Nonni ................ D21C 9/1036
162/67
2014/0274680 A1    9/2014 Nonni

FOREIGN PATENT DOCUMENTS

EP    1505198 A1    2/2005
WO    2006119392 A2    11/2006
(Continued)

OTHER PUBLICATIONS

International Search Report and Written Opinion mailed in International Application No. PCT/US2017/034463 dated Apr. 3, 2017.

*Primary Examiner* — Dennis R Cordray

(57) ABSTRACT

This disclosure relates to improved packaging materials containing oxidized cellulose. More particularly, this disclosure relates to improved packaging materials containing oxidized cellulose exhibiting one or more of improved odor control and/or improved antimicrobial properties. This disclosure further relates to the use of oxidized cellulose in packaging materials as an anti-counterfeiting agent, and methods of testing for the same.

13 Claims, 3 Drawing Sheets

(51) Int. Cl.
*D21C 9/16* (2006.01)
*D21H 21/32* (2006.01)
*D21H 21/40* (2006.01)
*D21H 11/20* (2006.01)
*D21H 11/04* (2006.01)
*C08B 15/04* (2006.01)

(52) U.S. Cl.
CPC ............ *D21H 11/20* (2013.01); *D21H 21/32* (2013.01); *D21H 21/40* (2013.01); *C08B 15/04* (2013.01)

(56) References Cited

FOREIGN PATENT DOCUMENTS

| | | |
|---|---|---|
| WO | 2010138941 A2 | 12/2010 |
| WO | 2013106703 A1 | 7/2013 |
| WO | 2014140852 A2 | 9/2014 |
| WO | 2015138335 A1 | 9/2015 |

\* cited by examiner

OXIDIZED CELLULOSE CONTAINING PACKAGING MATERIALS

This application is a national phase application based on PCT/US2017/034463, filed May 25, 2017, which claims the benefit of U.S. Provisional Application No. 62/344,578, filed Jun. 2, 2016, the contents of each of which are incorporated herein by reference.

TECHNICAL FIELD

This disclosure relates to improved packaging materials containing oxidized cellulose. More particularly, this disclosure relates to improved packaging materials containing oxidized cellulose exhibiting improved characteristics over the same packaging materials made without oxidized cellulose, including, but not limited to, improved odor control and/or improved antimicrobial properties. This disclosure further relates to the use of oxidized cellulose in packaging materials as an anti-counterfeiting agent, and methods of testing for the same.

BACKGROUND

Cellulose is a bio-based material that provides many advantages as an alternative to non-renewable packaging materials, such as plastics derived from oil. Cellulose is known to be useful in various types of packaging materials. There remains a need, however, to improve upon traditional cellulosic packaging materials by providing cellulosic materials with improved functionality, for example, improved odor control and/or improved antimicrobial properties.

There is also a need for a method of tracking the source of packaging or other cellulose-containing materials to protect against counterfeiting. In some instances, packaging materials may be misleadingly represented as from a particular source, when they are not. It would be beneficial to be able to confirm whether a given packaging material is in fact from its true source.

These needs may be met by the incorporation of an oxidized cellulose in packaging materials as described herein.

SUMMARY

The disclosed embodiments provide improved packaging materials containing oxidized cellulose, for example, boxboards, cartons (including folding cartons), corrugated boxes, fiberboards, papers, paperboards, films, coated and uncoated SBS, liquid package board, cup-stock, and the like. The oxidized cellulose may be used as a partial or complete replacement in packaging materials where nonoxidized cellulose has traditionally been used and/or in place of non-cellulose materials used in traditional packaging materials.

In some embodiments, the oxidized cellulose may be a kaft pulp. In some embodiments, the oxidized cellulose may be an oxidized kraft pulp exhibiting at least one of increased carboxyl content, increased carbonyl content, and/or decreased viscosity. In some embodiments, the oxidized cellulose may exhibit at least one of improved odor control and/or improved antimicrobial properties. In some embodiments, the oxidized cellulose may exhibit one or more of these beneficial characteristics while also maintaining one or more other characteristics of the non-oxidized cellulose, for example, maintaining one or more of fiber length, freeness, and/or brightness.

In some embodiments, the cellulose pulp may be oxidized with at least one peroxide and at least one catalyst under acidic conditions. In some embodiments, the peroxide may be hydrogen peroxide and the catalyst may be a catalyst comprising copper and/or iron. In some embodiments, the oxidized cellulose may be further treated with a carboxylating agent that converts aldehyde functional groups to carboxyl functional groups. In some embodiments, the carboxylating agent may be sodium chlorite and hydrogen peroxide or chlorine dioxide and hydrogen peroxide.

In some embodiments, the oxidized cellulose may be an unbleached kraft pulp. In some embodiments, the oxidized cellulose may be a bleached kraft pulp. In some embodiments, the cellulose may be a bleached kraft pulp that has been oxidized and/or treated with a carboxylating agent during one or more steps of a multi-stage bleaching process.

The disclosed embodiments also disclose the use of oxidized cellulose in packaging materials as an anti-counterfeiting agent, and methods of testing for the same. In some embodiments, oxidized cellulose as described herein may be incorporated into a packaging material, and the packaging material may later be tested to determine whether the packaging material still contains the oxidized cellulose, and is thus authentic and has not been replaced with a counterfeit material.

Additional objects and advantages of the present disclosure will be set forth in part in the description which follows. The objects and advantages of the present disclosure will further be realized and attained by means of the elements and combinations particularly pointed out in the appended claims.

The foregoing general description and the following detailed description are exemplary and explanatory only and are not restrictive of the claims.

DESCRIPTION

Figure 1A:
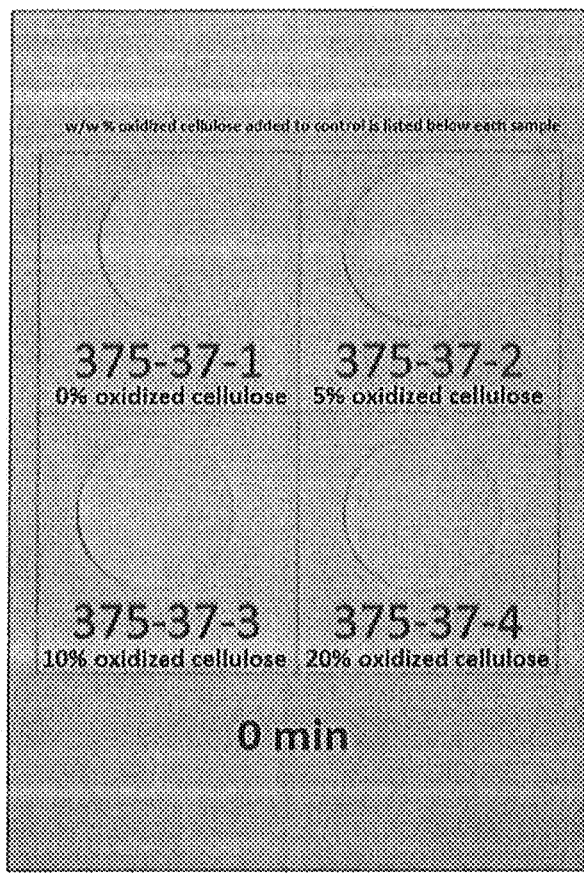
FIGS. 1A and 1B show the results of testing of cellulose materials with Tollens' reagent for the presence of oxidized cellulose.

The oxidized cellulose according to the disclosed embodiments may be derived from any common source of cellulose, including wood or cotton. As used herein, the term "cellulose" includes materials derived from any source of cellulose, which may also comprise other materials such as, for example, hemicellulose, lignin, and/or other common source materials, so long as the primary component is cellulose. In some embodiments, the cellulose may be derived from softwood fiber, hardwood fiber, or mixtures thereof. In some embodiments, the cellulose may be derived from softwood, such as southern pine. In some embodiments, the cellulose may be derived from hardwood, such as *eucalyptus*.

The cellulose may be in the form of a cellulose pulp derived from any common pulping process, including chemical, mechanical, or semi-mechanical. In some embodiments, the cellulose may be in the form of a pulp derived from a chemical process, for example a Kraft, sulfite, or sulfate pulps. In some embodiments, the cellulose may be a Kraft pulp.

Commonly, cellulose pulp production includes an oxygen delignification process between pulping and the start of bleaching. This oxygen delignification process generally further reduces the lignin content and improves the effectiveness of any subsequent bleaching sequence. In some embodiments, the cellulose is further subject to oxygen delignifyication after pulping. Oxygen delignification can be performed by any method known to those of ordinary skill in the art. For instance, oxygen delignification may be a conventional two-stage oxygen delignification.

The typical Kappa number (a measure used to estimate the amount of residual lignin in pulp) of softwood after Kraft pulping and prior to bleaching is in the range of 28 to 32. Kappa number is determined according to TAPPI T236 cm-85. In some embodiments, the cellulose may be subjected to a more severe "low kappa" pulping process, after which the kappa number of the cellulose pulp is instead ranging from about 10 to about 21. In some embodiments, the cellulose may be subject to Kraft pulping in a two-vessel hydraulic digester with, Lo-Solids cooking to a kappa number ranging from about 10 to about 21. In some embodiments, the cellulose pulp may then be subjected to oxygen delignification until it reaches a kappa number of about 10 or below, for example, 8 or below, or 6.5 or below.

Following pulping and/or oxygen delignification, cellulose pulps are commonly bleached, often in multi-stage sequences that traditionally comprise strongly acidic and strongly alkaline bleaching steps. Bleaching of wood pulp is generally conducted with the aim of selectively increasing the whiteness and/or brightness of the pulp, typically by removing lignin and other impurities, without negatively affecting other physical properties. Bleaching of chemical pulps, such as Kraft pulps, generally requires several different bleaching stages to achieve a desired whiteness and/or brightness with good selectivity. Typically, a bleaching sequence employs stages conducted at alternating pH ranges. This alternation is believed to aid in the removal of impurities generated in the bleaching sequence, for example, by solubilizing the products of lignin breakdown.

In some embodiments, the cellulose may be subjected to any known bleaching processes after pulping and/or oxygen delignification, including any conventional or after-discovered series of stages conducted under conventional conditions. In some embodiments, the multi-stage bleaching sequence is a five-stage bleaching sequence. In some embodiments, the bleaching sequence is a DEDED sequence, wherein "D" represents a bleaching stage comprising chlorine dioxide and operated at an acidic pH and "E" represents an alkaline extraction stage. In some embodiments, the bleaching sequence is a $D_0E_1D_1E_2D_2$ sequence, wherein the subscript numerals indicate that the conditions within each of the stages may be the same or vary from one another. In some embodiments the bleaching sequence is a $D_0(E_O)D_1E_2D_2$, wherein "$E_O$" represents an alkaline extraction stage further comprising treatment with oxygen. In some embodiments, the bleaching sequence is a $D_0(Eo_P)D_1E_2D_2$ sequence, wherein "$Eo_P$" represents an alkaline extraction stage further comprising treatment with oxygen and a peroxide.

In some embodiments, the bleaching process is conducted under conditions to target a final ISO brightness of at least about 85%, such as at least about 88%, or at least about 90%, for example, ranging from about 85 to about 95%, or from about 88% to about 90%. Brightness is determined according to TAPPI T525-om02. In some embodiments, the final ISO brightness may be achieved without the use of optical brightening agents. In some embodiments, an optical brightening agent can be added to further increase the ISO brightness of the bleached pulp in an amount of at least about 95%.

In some embodiments, the cellulose is derived from a process comprising kraft pulping, followed by oxygen delignification, followed by bleaching. In some embodiments, the cellulose is derived from a process comprising kraft pulping, without any bleaching. Unbleached Kraft pulp may also be referred to as "brown" kraft pulp.

According to the present invention, the cellulose (including any hemicellulose portion) is oxidized. As used herein, the term "oxidized cellulose" means a cellulose (including any hemicellulose portion) that has been chemically treated to increase the amount of carbonyl and/or carboxyl groups over the amount present in the cellulose prior to oxidation. Cellulose exists generally as a polymer chain comprising hundreds to tens of thousands of glucose units whereas hemicelluloses are polysaccharides generally consisting predominately of xylose in cellulose fibers derived from hardwoods and a combination of xylose, galactose and mannose in cellulose fibers derived from softwoods. In cellulose and hemicellulose oxidation, hydroxyl groups of the wood sugars of the cellulose and hemicellulose chains can be converted, for example, to carbonyl groups such as aldehyde groups, ketone groups, and/or to carboxylic acid groups. Various methods of oxidizing cellulose are known. Depending on the oxidation method and conditions used, the type, degree, and location of the modifications may vary. According to the present invention, the method of oxidation may be any known method of cellulose oxidation that increases the amount of carbonyl and/or carboxyl groups over the amount present in the cellulose prior to oxidation. In some embodiments, the oxidation increases both the carbonyl content and the carboxyl content of the cellulose pulp over the amount present in the cellulose prior to oxidation.

The oxidation of the cellulose may occur at any point during production of the cellulose, including before or after pulping, before or after oxygen delignification, before or after bleaching, or during one or more stages of the bleaching process. In some embodiments, the oxidized cellulose may be an oxidized cellulose that is never subjected to a bleaching process prior to incorporation into a packaging material. In some embodiments, the oxidized cellulose may be both bleached and oxidized prior to incorporation into a packaging material.

In some embodiments, the method comprises oxidizing the cellulose in one or more stages of a multi-stage bleaching sequence. In some embodiments, the multi-stage bleaching process may be a three, four, or five stage bleaching process. In some embodiments, the cellulose may be oxidized in either the second stage or the fourth stage of a multi-stage bleaching sequence, for example. In some embodiments, the oxidation may be carried out in two or more stages of a multi-stage bleaching sequence, for example, both the second and fourth stages of a multistage bleaching sequence. In some embodiments, the cellulose may be further oxidized in one or more additional stages preceding or following the bleaching sequence. The non-oxidation stages of a multi-stage bleaching sequence may include any conventional or after discovered series of stages and may be conducted under conventional conditions.

In some embodiments, the oxidation of the cellulose may comprise treating the cellulose with at least one peroxide and at least one catalyst. In some embodiments, the oxidation of the cellulose may comprise treating the cellulose with at least a catalytic amount of a metal catalyst, for example an iron or copper catalyst, and a peroxide, such as hydrogen peroxide. In some embodiments, the method comprises oxidizing the cellulose with iron and hydrogen peroxide. The source of iron can be any suitable source, as a person of skill would recognize, such as for example ferrous sulfate (for example ferrous sulfate heptahydrate), ferrous chloride, ferrous ammonium sulfate, ferric chloride, ferric ammonium sulfate, ferric ammonium citrate, or elemental iron. In some embodiments, the method comprises oxidizing the cellulose with copper and hydrogen peroxide. Similarly, the source of copper can be any suitable source as a person of skill would recognize. In some embodiments, the method comprises oxidizing the cellulose with a combination of copper and iron and hydrogen peroxide.

In some embodiments, the method comprises oxidizing the cellulose at an acidic pH. In some embodiments, the method comprises providing the cellulose, acidifying the cellulose, and then oxidizing the cellulose at acidic pH. In some embodiments, the pH of the oxidation ranges from about 2 to about 6, for example from about 2 to about 5 or from about 2 to about 4. In some embodiments, the cellulose is not subjected to substantially alkaline conditions during or after oxidation. In some embodiments, the cellulose is subjected to substantially alkaline conditions during or after oxidation in order to reduce the degree of polymerization of the cellulose. Without wishing to be bound by theory, it is believed that subjecting cellulose to alkaline conditions during or after oxidation results in the breaking of cellulose chains where dialdehyde or other similar groups may have been imparted by the oxidation.

In some embodiments, the method of oxidizing the cellulose may involve acidifying a kraft pulp to a pH ranging from about 2 to about 5 (using for example sulfuric acid), mixing a source of iron (for example ferrous sulfate or ferrous sulfate heptahydrate) with the acidified kraft pulp at an application of from about 25 to about 250 ppm $Fe^{+2}$ based on the dry weight of the kraft pulp and hydrogen peroxide, which can be added as a solution at a concentration of from about 1% to about 50% by weight and in an amount ranging from about 0.1% to about 2.0% based on the dry weight of the kraft pulp. In some embodiments, the ferrous sulfate solution is mixed with the kraft pulp at a consistency ranging from about 1% to about 15%, for example, from about 7% to about 15%. In some embodiments the acidic kraft pulp is mixed with the iron source and reacted with the hydrogen peroxide for a time period ranging from about 40 to about 240 minutes. In some embodiments the acidic kraft pulp is mixed with the iron source and reacted with the hydrogen peroxide at a temperature ranging from about 60 to about 80° C.

In some embodiments, wherein the oxidation is carried out with a catalytic amount of a metal catalyst, for example an iron or copper catalyst, and a peroxide, such as hydrogen peroxide, there is an acidic step, such as an acidic bleaching step, following oxidation, which step has been found to remove much, if not all, of the residual metal catalyst. In some embodiments, the acidic step is an acidic bleaching step comprising treatment with chlorine dioxide. In some embodiments, where an acidic step follows the catalytic oxidation step, the resultant oxidized cellulose has an iron and copper content of less than 10 ppm each, for example less than 5 ppm each, wherein iron and copper content is determined by acid digestion and analysis by ICP.

Pulping, bleaching, and oxidation processes that may be used in the instant invention include those disclosed in published International Applications Nos. WO/2010/138941, WO/2012/170183, and WO/2013/106703, which are incorporated herein by reference.

In some embodiments, the oxidized cellulose may be further treated to modify the oxidized cellulose functional characteristics prior to incorporation in a packaging material. In some embodiments, the oxidized cellulose may be treated with a carboxylating agent that converts aldehyde functional groups to carboxyl functional groups. In some embodiments, the carboxylating agent may be a carboxylating acid, for example chlorous acid, acidic potassium dichromate, and/or potassium permanganate. In some embodiments, the treatment of the oxidized cellulose with a carboxylating agent may involve treating the oxidized cellulose with a chlorous acid source, such as sodium chlorite and hydrogen peroxide or chlorine dioxide and hydrogen peroxide. In some embodiments, the method comprises treating the oxidized cellulose with a carboxylating agent comprising sodium chlorite and hydrogen peroxide. In some embodiments, the method comprises treating the oxidized cellulose with a carboxylating agent comprising chlorine dioxide and hydrogen peroxide.

In some embodiments, the carboxylating treatment may be carried out for a time and at a temperature that is sufficient to produce the desired completion of the reaction. For example, the carboxylating treatment may be carried out at a temperature of at least about 55° C., or at least about 80° C., and for a time ranging from about 15 to about 120 minutes, for example from about 15 to about 60 minutes, or from about 120 to about 150 minutes. The desired time and temperature of the carboxylating treatment will be readily ascertainable by a person of skill in the art depending on the desired conversion of aldehyde to carboxyl groups.

In some embodiments, a carboxylating agent may be added to the oxidized cellulose in an amount sufficient to achieve the desired carboxyl functionality of the final cellulose product. For example, sodium chlorite or chlorine dioxide can be added to the oxidized cellulose as a source of chlorous acid, as a solution at a concentration from about 0.1% to about 5%, for example from about 0.6% to about 2.0%, or from about 0.8% to about 1.4% by weight based on the dry weight of the pulp; and hydrogen peroxide can be added at a concentration of at least about 0.1%, at least about 0.15%, at least about 0.25%, or at least about 0.4%, for example from about 0.1% to about 5%, or from about 0.2% to about 1%, or from about 0.4% to about 0.8% by weight based on the dry weight of the pulp.

In some embodiments, the cellulose may be treated with a carboxylating agent after oxidation. In some embodiments, the cellulose may be treated with a carboxylating agent prior to oxidation. In some embodiments, the cellulose may be treated with a carboxylating agent both prior to and after oxidation.

In some embodiments, the oxidized cellulose may be treated with a carboxylating agent in one or more stages of a multi-stage bleaching sequence. In some embodiments, the method of preparing the oxidized cellulose comprises subjecting the cellulose to a kraft pulping step, an oxygen delignification step, and a multi-stage bleaching sequence which includes at least one catalytic oxidation stage and at least one carboxylating treatment stage following the at least one catalytic oxidation stage. In some embodiments, the cellulose may be treated with a carboxylating agent in at least one of the first, third, and/or fifth stage of a multi-stage bleaching sequence.

Accordingly, as described above, the cellulose may be subject to one or more of the following bleaching sequences, where C/A refers to carboxylating treatment, OX stands for oxidation, D stands for a bleaching stage comprising chlorine dioxide, and E refers to an E, EO, Ep, or EoP bleaching stage: $D_0(OX)D_1(OX)D_2$, $(C/A)(OX)D_1E_2D_2$, $D_0(OX)(C/A)E_2D_2$, $D_0(OX)D_1E_2(C/A)$, $(C/A)(OX)(C/A)E_2D_2$, $(C/A)(OX)D_1E_2(C/A)$, $D_0(OX)(C/A)E_2(C/A)$, $(C/A)(OX)(C/A)E_2(C/A)$, $(C/A)E_1D_1(OX)D_2$, $D_0E_1(C/A)(OX)D_2$, $D_0E_1D_1(OX)(C/A)$, $(C/A)E_1(C/A)(OX)D_2$, $(C/A)E_1D_1(OX)(C/A)$, $D_0E_1(C/A)(OX)(C/A)$, $(C/A)E_1(C/A)(OX)(C/A)$, $(C/A)(OX)D_1(OX)D_2$, $D_0(OX)(C/A)(OX)D_2$, $D_0(OX)D_1(OX)(C/A)$, $(C/A)(OX)(C/A)(OX)D_2$, $(C/A)(OX)D_1(OX)(C/A)$, $D_0(OX)(C/A)(OX)(C/A)$, and $(C/A)(OX)(C/A)(OX)(C/A)$.

Oxidation and carboxylating processes that may be used in the instant invention include those disclosed in published International Applications Nos. WO/2014/140940 and WO/2015/138335, which are incorporated herein by reference.

As used herein, the term "oxidized cellulose" may comprise situations wherein the cellulose has been oxidized but not further treated with a carboxylating agent or where the cellulose has been both oxidized and treated with a carboxylating agent.

In some embodiments, the oxidized cellulose may have a reduced viscosity compared to the cellulose prior to oxidation. In some embodiments, the viscosity may range from about 3.0 mPa·s to about 10 mPa·s, measured according to TAPPI T230-om99. In some embodiments, the viscosity ranges from about 4.0 mPa·s to about 8 mPa·s. In some embodiments, the viscosity ranges from about 4.5 mPa·s to about 6 mPa·s. In some embodiments, the viscosity ranges from about 5.0 mPa·s to about 5.5 mPa·s. In some embodiments, the viscosity of the oxidized cellulose is less than 10 mPa·s, less than 6 mPa·s, less than 5.5 mPa·s, less than 5.0 mPa·s, less than 4.5 mPa·s, or less than 3.5 mPa·s.

In some embodiments, when the oxidized cellulose is a softwood Kraft fiber, the cellulose fiber may have a length-weighted average fiber length that is about 2 mm or greater. Fiber length may be determined on a Fiber Quality Analyzer™ from OPTEST, Hawkesbury, Ontario, according to the manufacturer's standard procedures In some embodiments, the average fiber length is no more than about 3.7 mm. In some embodiments, the average fiber length is at least about 2.2 mm, about 2.3 mm, about 2.4 mm, about 2.5 mm, about 2.6 mm, about 2.7 mm, about 2.8 mm, about 2.9 mm, about 3.0 mm, about 3.1 mm, about 3.2 mm, about 3.3 mm, about 3.4 mm, about 3.5 mm, about 3.6 mm, or about 3.7 mm. In some embodiments, the average fiber length ranges from about 2 mm to about 3.7 mm, or from about 2.2 mm to about 3.7 mm.

In some embodiments, the oxidized cellulose may have a carboxyl content of at least about 3 meq/100 g, for example, at least about 5 meq/100 g, at least about 6 meq/100 g, at least about 7.0 meq/100 g, at least about 8.0 meq/100 g, or at least about 10.0 meq/100 g, measured according to TAPPI T237-cm98. In some embodiments, the carboxyl content ranges from about 3 meq/100 g to about 15 meq/100 g, for example from about 6 meq/100 g to about 12 meq/100 g.

In some embodiments, the oxidized cellulose may have an aldehyde content of at least about 3 meq/100 g, for example, at least about 5 meq/100 g, at least about 6 meq/100 g, at least about 7.0 meq/100 g, at least about 8.0 meq/100 g, or at least about 10.0 meq/100 g. In some embodiments, the carboxyl content ranges from about 3 meq/100 g to about 15 meq/100 g, for example from about 6 meq/100 g to about 12 meq/100 g. Aldehyde content is measured according to Econotech Services LTD, proprietary procedure ESM 055B.

The ratio of carboxyl content to aldehyde content in the oxidized cellulose may be from about 5:1 to 1:5, for example from about 1:1 to about 5:1, or from about 5:1 to 1:1. The ratio of carboxyl content to aldehyde content in the oxidized cellulose may be from about 3:1 to 1:3, for example from about 1:1 to about 3:1, or from about 3:1 to 1:1. The ratio of carboxyl content to aldehyde content in the oxidized cellulose may be from about 2:1 to 1:2, for example from about 1:1 to about 2:1, or from about 2:1 to 1:1.

In some embodiments, the oxidized cellulose has a copper number of greater than about 1, for example, greater than about 1.5, greater than about 2, greater than about 3, greater than about 5, or greater than about 7. In some embodiments, the oxidized cellulose has a copper number of from about 1 to 7, for example from about 3 to 5. Copper Number is measured according to TAPPI T430-cm99 and is believed to relate to the quantity of carbonyl groups on the cellulose.

In some embodiments, the oxidized cellulose of the disclosure has a carbonyl content of at least about 3 meq/100 g, for example, at least about 5 meq/100 g, at least about 6 meq/100 g, at least about 7.0 meq/100 g, at least about 8.0 meq/100 g, or at least about 10.0 meq/100 g. In some embodiments, the carbonyl content ranges from about 3 meq/100 g to about 15 meq/100 g, for example from about 6 meq/100 g to about 12 meq/100 g. Carbonyl content is calculated from Copper Number according to the formula: carbonyl=(Cu. No.—0.07)/0.6, from Biomacromolecules 2002, 3, 969-975.

In some embodiments, the hemicellulose content of the oxidized cellulose is substantially the same as the cellulose prior to oxidation. For example, the hemicellulose content for a softwood kraft fiber may range from about 16% to about 18%. For instance, the hemicellulose content of a hardwood kraft fiber may range from about 18% to about 25%. Carbohydrates are measured according to TAPPI T249-cm00, with analysis by Dionex ion chromatography. Cellulose content is calculated from carbohydrate composition according to the formula: Cellulose=Glucan-(Mannan/3), from TAPPI Journal 65(12):78-80 1982. Hemicellulose content is calculated from the sum of sugars minus the cellulose content.

R18 may also be used as an approximation for hemicellulose content. In some embodiments, the oxidized cellulose may have an R18 value ranging from about 75% to about 90%, for example from about 80% to about 90%, from about 80% to about 88%, or from about 82% to 86%. The R18 content is measured according to TAPPI T235-cm00.

In some embodiments, the oxidized cellulose of the disclosure has improved odor control properties. In some embodiments, the oxidized cellulose is capable of absorbing odorants, such as nitrogen containing odorants, for example ammonia. As used herein, the term "odorant" is understood to mean a chemical material that has a smell or odor, or that is capable of interacting with olfactory receptors, or to mean an organism, such as a bacteria, that is capable of generating compounds that generate a smell or odor, for example a bacteria that produces urea. In some embodiments, the oxidized cellulose is capable of reducing the odor of bodily waste, such as urine or menses, or from organic materials, such as food and vegetation. In some embodiments, the oxidized cellulose inhibits bacterial odor production, for example, in some embodiments, the oxidized cellulose inhibits bacterial ammonia production.

In some embodiments, the oxidized cellulose reduces atmospheric ammonia concentration more than the same non-oxidized cellulose. For example, the oxidized cellulose may reduce atmospheric ammonia by absorbing at least part of an ammonia sample applied to the oxidized cellulose, or by inhibiting bacterial ammonia production. In at least one embodiment, the oxidized cellulose fiber absorbs ammonia and inhibits bacterial ammonia production.

In some embodiments, the oxidized cellulose reduces at least about 40% more atmospheric ammonia than the same non-oxidized cellulose, for example at least about 50% more, or about 60% more, or about 70% more, or about 75% more, or about 80% more, or about 90% more ammonia than the same non-oxidized cellulose.

In some embodiments, the oxidized cellulose, after application of 0.12 g of a 50% solution of ammonium hydroxide to about nine grams of oxidized cellulose and a 45 minute incubation time, reduces atmospheric ammonia concentration in a volume of 1.6 L to less than 150 ppm, for example, less than about 125 ppm, for example less than bout 100 ppm, for example, less than about 75 ppm, for example, less than about 50 ppm.

In some embodiments, the oxidized cellulose absorbs at least about 5 ppm ammonia per gram of fiber, for example, at least about 7 ppm. For instance, the oxidized cellulose may absorb from about 5 to about 10 ppm, or from about 6 to about 10 ppm, or from about 7 to about 10 ppm, or from about 8 to about 10 ppm ammonia per gram of fibers.

In some embodiments, the oxidized cellulose or packaging material may comprise an additional anti-odor agent. Any common anti-odor agent may be used, and will be known to those of ordinary skill in the art. In some embodiments, the oxidized cellulose and/or packaging material may be made without the use of any additional anti-odor agents.

In some embodiments, the oxidized cellulose may exhibit improved antimicrobial activity. As used herein, the term antimicrobial activity refers to either antibacterial and/or antiviral activity, and includes either microbial-acidic and/or microbial-static activity. Without wishing to be bound by theory, it is believed that the increased carbonyl and/or carboxyl content of the cellulose following oxidation may contribute to the improved antimicrobial activity. For example, it is believed that the increased carboxylic acid content may create an acidic microenvironment to the cellulose fiber surface and surrounding environment, which acidic environment is lower than the optimal pH range for many microbes. The acidic environment may also be responsible for stabilizing chemical reactions which bind the functional groups of the oxidized cellulose to reactive groups on the microbial surface membrane, thus enhancing the antimicrobial effect. It is further believed that the increased aldehyde content may react with the microbial surface membrane thiol groups, thus disrupting the cell membrane. Aldehyde functional groups on the oxidized cellulose may also bind with nitrogen-containing material on the microbial surface membrane to disrupt the microbial cell membrane.

In some embodiments, the oxidized cellulose exhibits improved antibacterial activity compared to the same non-oxidized cellulose. In some embodiments, the oxidized cellulose has a bacteriostatic activity after 4 hours of at least 2.5, for example, at least 3.0, for example 3.5, as measured by the Absorption Method. In some embodiments, the oxidized cellulose has a bactericidal activity at 4 hours of at least 1.5, for example, at least 2.0, as measured by the Absorption Method. In some embodiments, the oxidized cellulose has antibacterial properties affecting common bacteria, including but not limited to, *Staphylococcus aureus, Escherichia coli, Salmonella enterica-pullorum, Listeria monocytogenes, Pseudomonas aeruginosa, Enterococcus faecalisi*, and the like.

In some embodiments, the oxidized cellulose has an MEM Elution Cytotoxicity Test, ISO 10993-5, of less than 2 on a zero to four scale. For example the cytotoxicity may be less than about 1.5 or less than about 1.

In some embodiments, the oxidized cellulose or packaging material may comprise an additional antibacterial agent additive. Any common antibacterial agent may be used, and will be known to those of ordinary skill in the art. In some embodiments, the oxidized cellulose and/or packaging material may be made without the use of any additional antibacterial agents.

In some embodiments, the oxidized cellulose exhibits antiviral activity. In some embodiments, the oxidized cellulose or packaging material may comprise an additional antiviral agent additive. Any common antiviral agent may be used, and will be known to those of ordinary skill in the art. In some embodiments, the oxidized cellulose and/or packaging material may be made without the use of any additional antiviral agents.

The oxidized cellulose may further be treated with other agents prior to incorporation into a packaging material, including, without limitation, one or more of surface active agents, softeners, debonders, starches, wet strength agents, and the like.

The oxidized cellulose may be incorporated into any a packaging material. The packaging material may be any packaging material known to incorporate non-oxidized cellulose, for example, without limitation, boxboards, cartons (including folding cartons), corrugated boxes, fiberboards, papers, paperboards, films, coated and uncoated SBS, liquid packaging board, cup stock and the like. The packaging may be in any known configuration, for example, without limitation, corrugated, folded, perforated, and the like. In some embodiments, the packaging material may be a packaging material for food contents. In some embodiments, the packaging material may be a container for produce. In some embodiments, the packaging material may be a container for meat or fish. In some embodiments, the packaging material may be may be a container for cigarettes.

In some embodiments, the oxidized cellulose may be used as a partial or complete replacement where non-oxidized cellulose is used in traditional packaging materials. In some embodiments, the oxidized cellulose may be used as a partial or complete replacement where other, non-cellulose materials are used in traditional packaging materials, such as a partial or complete replacement for a plastic, polymer, or the like.

In some embodiments, the oxidized cellulose may be included in the packaging material in an amount of at least about 2% oxidized cellulose by weight based on the weight of the packaging material, for example, at least about 5%, at least about 10%, at least about 20%, at least about 50%, at least about 75%, or 100%.

In some embodiments, the oxidized cellulose may be included in a packaging material and used as an anti-counterfeiting agent. In some embodiments, an oxidized cellulose may be incorporated into a packaging material and the packaging material may later be tested by a method capable of identifying the presence of the oxidized cellulose in order to confirm that the packaging material has not been replaced with a different packaging material that does not comprise the oxidized cellulose.

The method for testing for the presence of the oxidized cellulose may be any testing method capable of distinguishing between a packaging material comprising oxidized cellulose and a packaging material that does not comprise the oxidized cellulose. In some embodiments, the method of testing is a method capable of identifying the presence of the oxidized cellulose by identifying the elevated levels of carbonyl and/or carboxyl groups in the oxidized cellulose, as compared to non-oxidized cellulose. In some embodiments, the method of testing for the presence of the oxidized cellulose may comprise treating the packaging material, or a portion thereof, with a chemical reagent. As used herein, the term chemical reagent may refer to one or more chemical substances either alone, or in combination, such as in a solution, mixture, or the like.

In some embodiments, the chemical reagent is capable of identifying the presence of the oxidized cellulose by reacting with the elevated levels of carbonyl groups on the oxidized cellulose. In some embodiments, the chemical reagent is capable of identifying the presence of the oxidized cellulose by reacting with the elevated levels of carboxyl groups on the oxidized cellulose. In general, the higher the level of the oxidized cellulose in the material tested, the more pronounced identification of the oxidized cellulose in the material will be. In some embodiments, the test method can detect as little as 5% by weight incorporation of oxidized cellulose into a packaging material, or less.

In some embodiments, the method of testing for the presence of the oxidized cellulose may comprise treating the packaging material, or a portion thereof, with Tollen's reagent. Tollen's reagent comprises a solution of silver nitrate and ammonia, and, without wishing to be bound by theory, is believed to be able to identify the presence of the oxidized cellulose by reacting with the elevated levels of carbonyl groups on the oxidized cellulose (such as aldehydes and ketones), resulting in the precipitation of elemental silver and the production of a silver-mirror-like finish on the surface of the area tested. Thus, if the packaging material comprises oxidized cellulose, upon treatment with Tollens' reagent, it will exhibit the presence of a pronounced silver-mirror-like finish on the surface of the area tested, as compared to treatment of the same packaging material not comprising the oxidized cellulose. In some embodiments, the Tollen's reagent may be modified to additionally include NaOH.

In some embodiments, the method of testing for the presence of the oxidized cellulose may comprise treating the packaging material, or a portion thereof, with 2,4 Dinitrophenylhydrazine (2,4 DNPH). In some embodiments, the method of testing for the presence of the oxidized cellulose may comprise treating the packaging material, or a portion thereof, with Schiff's reagent.

If the test method is able to identify the presence of the oxidized cellulose in the packaging material, one may be able to authenticate that the packaging material tested has not been replaced with another packaging material that does not contain the oxidized cellulose. To the contrary, if the test method does not identify the presence of the oxidized cellulose in the packaging material, it may be concluded that the packaging material tested is not the same as the original packaging material that was made with the inclusion of the oxidized cellulose. In such circumstances, it may be hypothesized that the original packaging material made with the inclusion of the oxidized cellulose has been replaced with a counterfeit version of the packaging material that does not include the oxidized cellulose. In this way, producers of oxidized cellulose and/or packaging materials comprising oxidized cellulose may be able to track any products being sold under the representation that it is from the source including the oxidized cellulose to determine if the representation is accurate.

While this method of anti-counterfeiting has been described in the context of packaging materials, it will be understood that oxidized cellulose may be incorporated into other types of products commonly employing cellulose for purposes of anti-counterfeiting, for example, pulp, paper, fluff, absorbent hygiene articles, filters, fillers, extenders, cellulose ethers, cellulose esters, microcrystalline cellulose, viscose, lyocell, and the like.

EXAMPLES

A. Test Protocols
1. Caustic solubility (R10, S10, R18, S18) is measured according to TAPPI T235-cm00.
2. Carboxyl content is measured according to TAPPI T237-cm98.
3. Aldehyde content is measured according to Econotech Services LTD, proprietary procedure ESM 055B.
4. Copper Number is measured according to TAPPI T430-cm99.
5. Carbonyl content is calculated from Copper Number according to the formula: carbonyl=(Cu. No.—0.07)/0.6, from Biomacromolecules 2002, 3, 969-975.
6. 0.5% Capillary CED Viscosity is measured according to TAPPI T230-om99.
7. Intrinsic Viscosity is measured according to ASTM D1795 (2007).
8. DP is calculated from 0.5% Capillary CED Viscosity according to the formula: DPw=−449.6+598.4 ln(0.5% Capillary CED)+118.02 $\ln^2$ (0.5% Capillary CED), from the 1994 Cellucon Conference published in *The Chemistry and Processing Of Wood And Plant Fibrous Materials*, p. 155, woodhead Publishing Ltd, Abington Hall, Abington, Cambridge CBI 6AH, England, J. F. Kennedy, et al. editors.
9. Carbohydrates are measured according to TAPPI T249-cm00 with analysis by Dionex ion chromatography.
10. Cellulose content is calculated from carbohydrate composition according to the formula: Cellulose=Glucan-(Mannan/3), from TAPPI Journal 65(12):78-80 1982.
11. Hemicellulose content is calculated from the sum of sugars minus the cellulose content.
12. Fiber length and coarseness is determined on a Fiber Quality Analyzer™ from OPTEST, Hawkesbury, Ontario, according to the manufacturer's standard procedures.
13. Wet Zero Span Tensile is determined according to TAPPI T273-pm99.
14. Freeness is determined according to TAPPI T227-om99.
15. DCM (dichloromethane) extractives are determined according to TAPPI T204-cm97.
16. Iron content is determined by acid digestion and analysis by ICP.
17. Ash content is determined according to TAPPI T211-om02.
18. Brightness is determined according to TAPPI T525-om02.
19. Fiber Length and shape factor are determined on an L&W Fiber Tester from Lorentzen & Wettre, Kista, Sweden, according to the manufacturer's standard procedures.

Oxidized Cellulose Example 1

Southern pine chips were cooked in a two vessel continuous digester with Lo-Solids® downflow cooking. The white liquor application was 8.42% as effective alkali (EA) in the impregnation vessel and 8.59% in the quench circulation. The quench temperature was 166° C. The kappa no. after digesting was 20.4. The brownstock pulp was further delignified in a two stage oxygen delignification system with 2.98% sodium hydroxide (NaOH) and 2.31% oxygen ($O_2$) applied. The temperature was 98° C. The first reactor pressure was 758 kPa and the second reactor was 372 kPa. The kappa no. was 6.95.

The oxygen delignified pulp was bleached in a 5 stage bleach plant. The first chlorine dioxide stage ($D_0$) was carried out with 0.90% chlorine dioxide ($ClO_2$) applied at a temperature of 61° C. and a pH of 2.4.

The second or oxidative alkaline extraction stage (EOP) was carried out at a temperature of 76° C. NaOH was applied at 0.98%, hydrogen peroxide ($H_2O_2$) at 0.44%, and oxygen ($O_2$) at 0.54%. The kappa no. after oxygen delignification was 2.1.

The third or chlorine dioxide stage ($D_1$) was carried out at a temperature of 74° C. and a pH of 3.3. $ClO_2$ was applied at 0.61% and NaOH at 0.02%. The 0.5% Capillary CED viscosity was 10.0 mPa·s.

The fourth stage was altered to produce a low viscosity pulp. Ferrous sulfate heptahydrate ($FeSO_4.7H_2O$) was added as a 2.5 lb/gal aqueous solution at a rate to provide 75 ppm $Fe^{+2}$ on pulp at the repulper of the $D_1$ washer. The pH of the stage was 3.3 and the temperature was 80° C. $H_2O_2$ was applied at 0.26% on pulp at the suction of the stage feed pump.

The fifth or final chlorine dioxide stage ($D_2$) was carried out at a temperature of 80° C., and a pH of 3.9 with 0.16% $ClO_2$ applied. The viscosity was 5.0 mPa·s and the brightness was 90.0% ISO.

The iron content was 10.3 ppm, the measured extractives were 0.018%, and the ash content was 0.1%. Additional results are set forth in Table 1 below.

Oxidized Cellulose Example 2

Southern pine chips were cooked in a two vessel continuous digester with Lo-Solids® downflow cooking. The white liquor application was 18.7% as effective alkali (EA) with half being added in the impregnation vessel and half being added in the quench circulation. The quench temperature was 165° C. The kappa no. after digesting averaged 14. The brownstock pulp was further delignified in a two stage oxygen delignification system with 2.84% sodium hydroxide (NaOH) and 1.47% oxygen ($O_2$) applied. The temperature was 92 to 94° C. The Kappa number was 5.6.

The oxygen delignified pulp was bleached in a 5 stage bleach plant. The first chlorine dioxide stage (D0) was carried out with 0.71% chlorine dioxide ($ClO_2$) applied at a temperature of 63° C. and a pH of 2.5. The Kappa number following the ($D_0$) stage was 1.7

The second stage was altered to produce a low viscosity pulp.

Ferrous sulfate heptahydrate ($FeSO_4.7H_2O$) was added as a 2.5 lb/gal aqueous solution at a rate to provide 25 ppm $Fe^{+2}$, which was increased to 40 ppm $Fe^{+2}$ on pulp. The pH of the stage was 2.8 and the temperature was 82° C. $H_2O_2$ was applied at 0.25% on pulp at the suction of the stage feed pump.

The third or chlorine dioxide stage ($D_1$) was carried out at a temperature of 79.5° C. and a pH of 2.9, $ClO_2$ was applied at 0.90% and NaOH at 10.43%. The 0.5% Capillary CED viscosity was between 5.4 and 6.1 mPa·s.

The fourth or alkaline extraction stage ($E_P$) was carried out at a temperature of 76° C. NaOH was applied at 1.54%, and hydrogen peroxide ($H_2O_2$) at 0.28%. The pH was 11.3

The fifth or final chlorine dioxide stage ($D_2$) was carried out at a temperature of 72° C., and a pH of 4.4 with 0.14% $ClO_2$ applied. Fiber characteristics are set forth in Table 1, below.

Oxidized Cellulose Example 3

Southern pine chips were cooked in a two vessel continuous digester with Lo-Solids® downflow cooking. The white liquor application was 8.32% as effective alkali (EA) in the impregnation vessel and 8.46% in the quench circulation. The quench temperature was 162° C. The kappa no. after digesting was 27.8. The brownstock pulp was further delignified in a two stage oxygen delignification system with 2.44% NaOH and 1.91% 02 applied. The temperature was 97° C. The first reactor pressure was 779 kPa and the second reactor was 386 kPa. The kappa no. after oxygen delignification was 10.3.

The oxygen delignified pulp was bleached in a 5 stage bleach plant. The first chlorine dioxide stage ($D_0$) was carried out with 0.94% $ClO_2$ applied at a temperature of 66° C. and a pH of 2.4.

The second or oxidative alkaline extraction stage (EOP) was carried out at a temperature of 83° C. NaOH was applied at 0.89%, $H_2O_2$ at 0.33%, and 02 at 0.20%. The kappa no. after the stage was 2.9.

The third or chlorine dioxide stage ($D_1$) was carried out at a temperature of 77° C. and a pH of 2.9. $ClO_2$ was applied at 0.76% and NaOH at 0.13%. The 0.5% Capillary CED viscosity was 14.0 mPa·s.

The fourth stage was altered to produce a low viscosity pulp. Ferrous sulfate heptahydrate ($FeSO_4.7H_2O$) was added as a 2.5 lb/gal aqueous solution at a rate to provide 150 ppm $Fe^{+2}$ on pulp at the repulper of the $D_1$ washer. The pH of the stage was 2.6 and the temperature was 82° C. $H_2O_2$ was applied at 1.6% on pulp at the suction of the stage feed pump.

The fifth or final chlorine dioxide stage ($D_2$) was carried out at a temperature of 85° C., and a pH of 3.35 with 0.13% $ClO_2$ applied. The viscosity was 3.6 mPa·s and the brightness was 88.7% ISO.

Each of the bleached pulps produced in the above examples were made into a pulp board on a Fourdrinier type pulp dryer with an airborne Fläkt dryer section. Samples of each pulp were collected and analyzed for chemical composition and fiber properties. The results are shown in Table 1.

TABLE 1

| Property | units | Example 1 | Example 2 | Example 3 |
|---|---|---|---|---|
| R10 | % | 81.5 | 84.2 | 71.6 |
| S10 | % | 18.5 | 15.7 | 28.4 |
| R18 | % | 85.4 | 87.6 | 78.6 |
| S18 | % | 14.6 | 12.2 | 21.4 |
| ΔR | | 3.9 | 3.6 | 7.0 |
| Carboxyl | meq/100 g | 3.14 | 3.8 | 3.98 |
| Aldehydes | meq/100 g | 1.80 | 0.74 | 5.79 |
| Copper No. | | 1.36 | 0.69 | 3.81 |
| Calculated Carbonyl* | mmole/100 g | 2.15 | 1.03 | 6.23 |
| CED Viscosity | mPa · s | 5.0 | 5.8 | 3.6 |
| Intrinsic Viscosity | [h] dl/g | 3.58 | 4.06 | 2.52 |
| Calculated DP*** | $DP_w$ | 819 | 967 | 511 |
| Glucan | % | 83.5 | 82.9 | 83.3 |
| Xylan | % | 7.6 | 7.4 | 7.6 |

TABLE 1-continued

| Property | units | Example 1 | Example 2 | Example 3 |
|---|---|---|---|---|
| Galactan | % | <0.1 | 0.3 | 0.1 |
| Mannan | % | 6.3 | 5.8 | 6.3 |
| Arabinan | % | 0.4 | 0.3 | 0.2 |
| Calculated Cellulose** | % | 81.4 | 81.0 | 81.2 |
| Calculated Hemicellulose | % | 16.5 | 15.7 | 16.3 |

Oxidized Cellulose Example 4

A Southern pine pulp was collected from the $D_1$ stage of a $D(E_O)D(E_P)D$ sequence. The starting 0.5% Capillary CED viscosity was 14.8 mPa·s. Hydrogen peroxide was added at 1% on pulp with either 100, 150, or 200 pm of $Cu^{+2}$ added as $CuSO_4 \cdot 5H_2O$. Other treatment conditions were 10% consistency, 800° C., and 3.5 hours reaction time. The results are shown in Table 2.

TABLE 2

| $H_2O_2$ added % on pulp | $H_2O_2$ consumed % on pulp | $Cu^{+2}$ ppm on pulp | pH final | 0.5% Capillary CED Viscosity mPa·s | ΔViscosity | Dpw | Carboxyl meq/100 g | Aldehyde meq/100 g | Copper no. |
|---|---|---|---|---|---|---|---|---|---|
| Control | | | | 14.8 | | 2020 | 3.36 | 0.37 | 0.51 |
| 1.0 | 0.82 | 100 | 2.4 | 6.1 | 8.7 | 1018 | | | |
| 1.0 | 0.94 | 150 | 2.3 | 5.9 | 8.9 | 984 | | | |
| 1.0 | 0.94 | 200 | 2.4 | 6.0 | 8.8 | 1001 | 3.37 | 2.71 | 1.8 |

The use of copper instead of iron resulted in a slower reaction and a lower reduction in viscosity, but still a significant change in viscosity, carboxyl content, and aldehyde content over non-oxidized pulp.

Oxidized Cellulose Example 5

Cellulose pulp prepared generally according to Example 1, i.e., five stage bleaching where oxidation is carried out in the fourth stage, was subject to a carboxylating acid treatment with chlorous acid in the fifth or $D_2$ acid treatment stage.

The oxidation stage was carried out at a temperature of 80° C. and a pH of 2.65. An iron source was added at a rate to provide 150 ppm $Fe^{+2}$. $H_2O_2$ was applied at 1.5% on pulp.

The carboxylating treatment stage ($D_2$) was carried out at a temperature of 80° C. and a pH of 2.69 with 0.6% $H_2O_2$ and 1.6% $NaClO_2$ applied.

Fiber characteristics are set forth in Table 3, below, comparing the fiber to itself as it moves along the bleaching sequence, specifically, after the $D_1$ stage, after the fourth or oxidation stage and after the $D_2$ or acid treatment stage.

TABLE 3

| Property | Unit(s) | Bleached Fiber (After Stage 3) | Oxidized Fiber (After Stage 4) | Oxidized Acid-Treated Fiber (After Stage 5) |
|---|---|---|---|---|
| Viscosity | cps | 7.68 | 3.25 | 3.25 |
| Carboxyl | meq/100 g | 3.15 | 3.66 | 7.28 |
| Aldehyde | meq/100 g | 0.14 | 4.73 | 0.64 |
| Copper No. | | 0.36 | 4.15 | 1.61 |
| Carbonyl | meq/100 g | 0.48 | 6.8 | 2.62 |

Oxidized Cellulose Example 6

Cellulose pulp prepared generally according to Example 1, i.e., five stage bleaching where oxidation is carried out in the fourth stage, was subject to a carboxylating acid treatment with chlorous acid in the fifth or $D_2$ acid treatment stage.

The fourth oxidation stage was carried out at a temperature of 80° C. and a pH of 2.05. An iron source was added at a rate to provide 300 ppm $Fe^{+2}$. $H_2O_2$ was applied at 3.0% on pulp at the suction of the stage feed pump.

The fifth or carboxylating treatment stage ($D_2$) was carried out at a temperature of 80° C. and a pH of 2.86 with 0.8% $H_2O_2$ and 2.4% $NaClO_2$ applied.

Fiber characteristics are set forth in Table 4, below, comparing the fiber to itself as it moves along the bleaching sequence, specifically, after the $D_1$ stage, and after the $D_2$ or acid treatment stage.

TABLE 4

| Property | Unit(s) | Bleached Fiber (After Stage 3) | Oxidized Acid-Treated Fiber (After Stage 5) |
|---|---|---|---|
| Viscosity | cps | 7.68 | 3.64 |
| Carboxyl | meq/100 g | 3.15 | 7.77 |
| Aldehyde | meq/100 g | 0.14 | 0.36 |
| Copper No. | | 0.36 | 1.58 |
| Carbonyl | meq/100 g | 0.48 | 2.52 |

Oxidized Cellulose Example 7

Southern pine chips were cooked in a two vessel continuous digester with Lo-Solids® downflow cooking. The white liquor application was 16% as effective alkali (EA) with half being added in the impregnation vessel and half being added in the quench circulation. The quench temperature was 162° C. The kappa no. after digesting averaged 30. The brownstock pulp was further delignified in a two stage oxygen delignification system with 3.1% sodium hydroxide (NaOH) and 2.0% oxygen ($O_2$) applied. The temperature was 92 to 94° C. The Kappa number was 12.7.

The oxygen delignified pulp was bleached in a 5 stage bleach plant. The first chlorine dioxide stage ($D_0$) was carried out with 1.0% chlorine dioxide ($ClO_2$) applied at a temperature of 63° C. and a pH of 2.5.

The second stage was altered to produce a low viscosity pulp. Ferrous sulfate heptahydrate ($FeSO_4 \cdot 7H_2O$) was added as a 2.5 lb/gal aqueous solution at a rate to provide 128 ppm $Fe^{+2}$. The pH of the stage was 3.2 and the temperature was 165° C. $H_2O_2$ was applied at 1.5% on pulp at the suction of the stage feed pump. The 0.5% Capillary CED viscosity was 4.7 mPa·s.

The third, a carboxylating stage, ($D_1$) was carried out at a temperature of 73° C. and a pH of 2.0, $ClO_2$ was applied at 1.4% and hydrogen peroxide ($H_2O_2$) at 0.4%. The 0.5% Capillary CED viscosity was 4.8 mPa·s.

The fourth or alkaline extraction stage ($E_P$) was carried out at a pH of 10.6. NaOH was applied at 1.25%, and hydrogen peroxide ($H_2O_2$) at 0.4%. The 0.5% Capillary CED viscosity was 4.6 mPa·s.

The fifth or final chlorine dioxide stage ($D_2$) was carried out at a temperature of 72° C., and a pH of 4.1 with 0.25% $ClO_2$ applied.

Fiber characteristics are set forth in Table 5, below.

TABLE 5

| Property | units | Example 6 |
|---|---|---|
| R10 | % | 79.8 |
| S10 | % | 20.2 |
| R18 | % | 85 |
| S18 | % | 15 |
| ΔR |  | 5.2 |
| Carboxyl | meq/100 g | 6.7 |
| Aldehydes | meq/100 g | 0.9 |
| Copper No. |  | 2 |
| Calculated Carbonyl* | mmole/100 g | 3.2 |
| CED Viscosity | mPa · s | 4.9 |
| Intrinsic Viscosity | [h] dl/g | 3.65 |
| Calculated DP*** | $DP_w$ | 800 |
| Glucan | % | 85.1 |
| Xylan | % | 8.8 |
| Galactan | % | 0.2 |
| Mannan | % | 5.6 |
| Arabinan | % | 0.2 |
| Iron Content | ppm | 2.0 |

Example 8

A Southern pine pulp was collected from the $D_1$ stage of a $D(E_O)D(E_P)D$ bleaching sequence. The starting 0.5% Capillary CED viscosity was 14.9 mPa·s (DPw 2028). Either 1.0% or 2% hydrogen peroxide was added with 100 or 200 ppm of $Fe^{+2}$ respectively. Other treatment conditions were 10% consistency, 80° C., and 1 hour retention time. These fluff pulps were then slurried with deionized water, wetlaid on a screen to form a fiber mat, dewatered via roller press, and dried at 250° F. The dry sheets were defibrated and airformed into 4"×7" airlaid pads weighing 8.5 grams (air dried) using a Kamas Laboratory Hammermill (Kamas Industries, Sweden). A single, complete coverage sheet of nonwoven coverstock was applied to one face of each pad and the samples were densified using a Carver hydraulic platen press applying a load of 145 psig.

These pads were placed in individual 1.6 L airtight plastic containers having a removable lid fitted with a check valve and sampling port of ¼" ID Tygon® tubing. Before securing the lid of the container, an insult of 60 grams deionized water and 0.12 gram 50% $NH_4OH$ at room temperature was poured into a centered 1" ID vertical tube on a delivery device capable of applying a 0.1 psi load across the entirety of the sample. Upon full absorption of the insult, the delivery device was removed from the sample, the lid, with sealed sampling port, was fitted to the container, and a countdown timer started. At the conclusion of 45 minutes, a headspace sample was taken from the sampling port with an ammonia-selective short-term gas detection tube and ACCURO® bellows pump, both available from Draeger Safety Inc., Pittsburgh, Pa. The data in Table 6 show that the oxidized celluloses produced within the scope of this disclosure were able to reduce the amount of ammonia gas in the headspace, resulting in a structure that provides suppression of a volatile malodorous compound often cited as unpleasant in wetted incontinence products.

TABLE 6

| Insult-60 g $H_2O$/ 0.12 g 50% $NH_4OH$ | 0.5% CED Viscosity (mPa · s) | Aldehyde Content meq/100 g | Air Laid Pad Weight (g) | Ammonia (ppm) @ 45 mins |
|---|---|---|---|---|
| Standard Kraft Southern Pine Fiber | 14.9 | 0.23 | 9.16 | 210 |
| Oxidized Kraft Southern Pine Fiber-1.0% $H_2O_2$/100 ppm Fe | 4.7 | 3.26 | 9.11 | 133 |
| Oxidized Kraft Southern Pine Fiber-2.0% $H_2O_2$/200 ppm Fe | 3.8 | 4.32 | 9.23 | 107 |

Example 9

The $E_2$ ($E_P$) stage of a D(EOP)D(EP)D bleaching sequence was altered to produce a low viscosity pulp. A solution of $FeSO_4 \cdot 7H_2O$ was sprayed on the pulp at the washer repulper of the $D_1$ stage at an application rate of 100 ppm as $Fe^{+2}$. No caustic (NaOH) was added to the $E_2$ stage and hydrogen peroxide was applied in the $E_2$ stage at 1.4%. The retention time was approximately 1 hour and the temperature was 79° C. The pH was 2.9. The treated pulp was washed on a vacuum drum washer and subsequently treated in the final $D_2$ stage with 0.7% $ClO_2$ for approximately 2 hours at 91° C. The 0.5% Capillary CED viscosity of the final bleached pulp was 6.5 mPa·s (DPw 1084) and the ISO brightness was 87. The pulp properties are shown in Table 7.

TABLE 7

| Property |  | ULDP |
|---|---|---|
| R10 | % | 72.5 |
| S10 | % | 27.5 |
| R18 | % | 78.7 |
| S18 | % | 21.3 |
| ΔR |  | 6.2 |
| Carboxyl | meq/100 g | 3.94 |
| Aldehydes | meq/100 g | 4.21 |
| Copper No. |  | 4.25 |
| Calculated Carbonyl | mmole/100 g | 6.97 |
| 0.5% Capillary CED Viscosity | mPa · s | 3.50 |
| Intrinsic Viscosity | dl/g | 2.49 |
| Calculated DP | $DP_w$ | 485 |
| Lwl Fiber Length | mm | 2.31 |
| Coarseness | mg/m | 0.19 |
| Brightness | % ISO | 88.5 |

The oxidized chemical cellulose produced was made into a pulp board on a Fourdrinier type pulp dryer with an airborne Flakt™ dryer section. Samples of this product and control kraft pulp board were defibrated using the Kamas laboratory hammermill. The defibrated fibers were air-formed into 4"×7" pads weighing 4.25 grams (air-dried). Sodium polyacrylate superabsorbent (SAP) granules sourced from BASF were applied evenly between two 4.25 gram pads. A full coverage nonwoven coverstock was applied to the top face of the fiber/SAP matrix and the pad was densified by a load of 145 psig applied via Carver platen press.

Synthetic urine was prepared by dissolving 2% Urea, 0.9% Sodium Chloride, and 0.24% nutrient broth (Criterion™ brand available through Hardy Diagnostics, Santa Maria, Calif.) in deionized water, and adding an aliquot of *Proteus Vulgaris* resulting in a starting bacterial concentration of $1.4 \times 10^7$ CFU/ml. The pad described above was then placed in a headspace chamber as described in Example 8 and insulted with 80 ml of the synthetic urine solution. Immediately after insult, the chamber was sealed and placed in an environment with a temperature of 30° C. Drager sampling was performed in series at time intervals of four hours and seven hours. The experiment was repeated three times, and the average results are reported in Table 8.

TABLE 8

| | % SAP add on | Ammonia (ppm) @ 4 hrs | % reduction over control | Ammonia (ppm) @ 7 hrs | % reduction over control |
|---|---|---|---|---|---|
| Oxidized Kraft Southern Pine Fiber | 23 | 2.5 | | 29 | |
| Control Kraft Southern Pine Fiber | 23 | 21.5 | 88 | 175 | 83 |
| Oxidized Kraft Southern Pine Fiber | 16.5 | 6.5 | | 123 | |
| Control Kraft Southern Pine Fiber | 16.5 | 36.5 | 82 | 550 | 78 |
| Oxidized Kraft Southern Pine Fiber | 0 | 70 | | 317 | |
| Control Kraft Southern Pine Fiber | 0 | 197.5 | 65 | 575 | 45 |

As can be seen from the data, atmospheric ammonia resulting from bacterial hydrolysis of urea is lower in composite structures (similar in construction to retail urinary incontinence products) incorporating oxidized cellulose fibers produced within the scope of this disclosure versus composite structures produced with standard kraft southern pine fibers. Thus, structures comprising oxidized cellulose fibers according to the disclosure had better odor control properties than standard kraft southern pine fibers.

Example 10

The antimicrobial effectiveness of the fiber of the present invention was evaluated using two testing methods, the Halo Method and the Absorption Method. The Halo Method evaluates antibacterial activity by the existence of halos, or clear zone of inhibition. The Absorption Method evaluates antibacterial activity by the bacteriostatic activity value and the bactericidal activity value.

Test samples were prepared from fibers of the present invention and a standard fluff pulp (GP Leaf River Cellulose fluff grade fiber, New Augusta, Miss.).

The halo test is applicable to those treatments that can diffuse into the agar medium. The halo test was carried out using an inoculum of *Escherichia coli* ATCC #25922 that was adjusted in nutrient broth to 106 Colony-Forming Units per milliliter (CFU/mL). One (1.0) mL of the adjusted inoculum was placed into sterile Petri dishes. Approximately 15 mL of nutrient agar was added to each dish and mixed well. After the plates had solidified, test samples were placed onto the center of the plate ensuring good contact with the inoculated agar. The plates were incubated for 48 hours at 35° C. After incubation, each plate was examined for a halo (zone of inhibition). The results are set forth in Table 9.

TABLE 9

| Bacteria Concentration (cells/mL) | $4.3 \times 10^6$ |
|---|---|
| Average Width of Halos (mm) | 0 mm - No Zone of Inhibition |
| Existence of Halos | Non-existent |

As can be seen from the results above, the biocidal activity in the fiber of the invention is not based upon something that can migrate to the surrounding agar.

The samples were further tested by the absorption method. The absorption method evaluates antibacterial activity by the bacteriostatic activity value and the bactericidal activity value. The bacteriostatic activity value determines the ability of a sample to inhibit growth. The bactericidal activity value determines the samples ability to kill the bacteria.

The absorption method was carried out using inoculum of *Escherichia coli* ATCC #25922, which was adjusted with a spectrophotometer to a concentration of approximately 108 CFU/mL. Nutrient broth was used to further dilute the inoculum to 105 CFU/mL. The test samples and the standard control cloth were tested in triplicate at Times=0, 4, and 18 hours. Each test sample was placed in a sterile container and then inoculated with 0.2 mL of the inoculum. The samples were incubated for 4 and 18 hours at 35° C. At the appropriate contact time, 20.0 mL of ice-chilled saline was added to the container and shaken for 1 minute to facilitate the release of the inoculum from the sample surface into the saline solution. Serial dilutions of the saline solution containing the inoculum were plated. All plates were incubated at 35° C. for 24-48 hours. After incubation, bacterial colonies were counted and recorded. The results are set forth in Tables 10-12.

TABLE 10

| Bacterial Concentration | $1.5 \times 10^6$ |
|---|---|
| Growth Value (4 hrs) | 1.9 |
| Growth Value (18 hrs) | 3.0 |

TABLE 11

| Sample (4 hours) | Bacteriostatic Activity | Bactericidal Activity |
|---|---|---|
| Invention | 3.9 | 2.3 |
| Prior Art Fiber | 2.1 | −0.1 |

TABLE 12

| Sample (18 hours) | Bacteriostatic Activity | Bactericidal Activity |
|---|---|---|
| Invention | 6.2 | 3.5 |
| Prior Art Fiber | 6.9 | 3.5 |

The bacteriostatic activity is the difference between the treated sample immediately after inoculation and treated sample after the contact time which is them subtracted from the growth rate.

The bactericidal activity value is the difference between the standard cloth immediately after inoculation and the sample after the contact time.

Example 11

Never dried pulp was acquired from a bleached board mill as a mixture of hardwood and softwood fiber board furnish. An oxidized cellulose made according to a process similar to Example 3 was also acquired. The oxidized cellulose was mixed with the board furnish at levels of 0, 5, 10, and 20% by weight. Sheets were then made on a laboratory sheet former at a basis weight of 260 g/m2 and dried on a drum dryer.

Figure 1B:
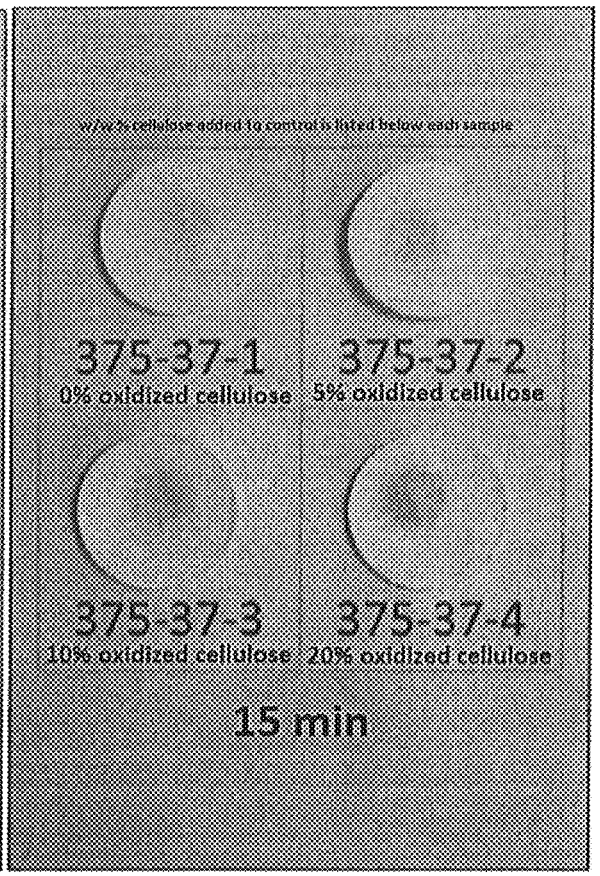

A Tollen's reagent (2 mL of 0.2M AgNO$_3$ with one drop of 3M NaOH) was used as the fiber stain to detect the oxidized cellulose in the sheet. The reagent was added as 3-5 drops to a 2" circle cut from each sheet. The progress of the color change was followed on each sheet as a function of time and photographically recorded. FIG. 1A shows the sheets with the oxidized cellulose addition level indicated before the reagent was added. FIG. 1B shows the progress of the color change after 15 minutes. Earlier and later times (up to 1 hr 30 min) were also observed and 15 minutes was judged to be the maximum effect of the reagent. A distinct color difference from the reagent could be observed with as little as 5% oxidized cellulose added compared to the 0% control.

Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

Example 12

Figure 2:
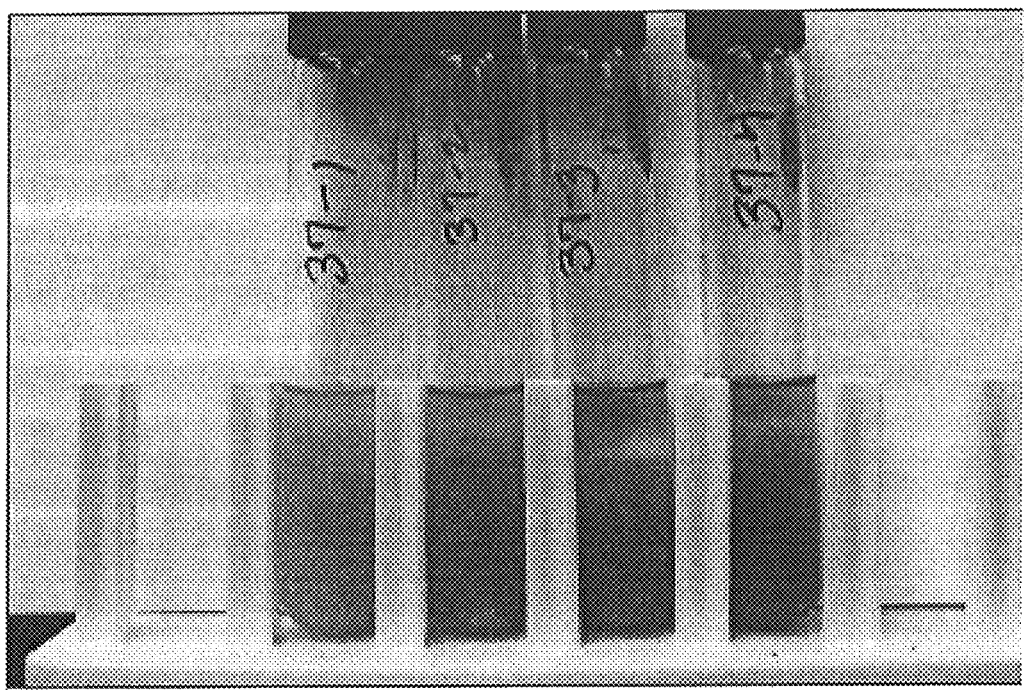
FIG. 2 show the results of absorbance testing of cellulose materials with Tollens' reagent for the presence of oxidized cellulose.
Figure 3:
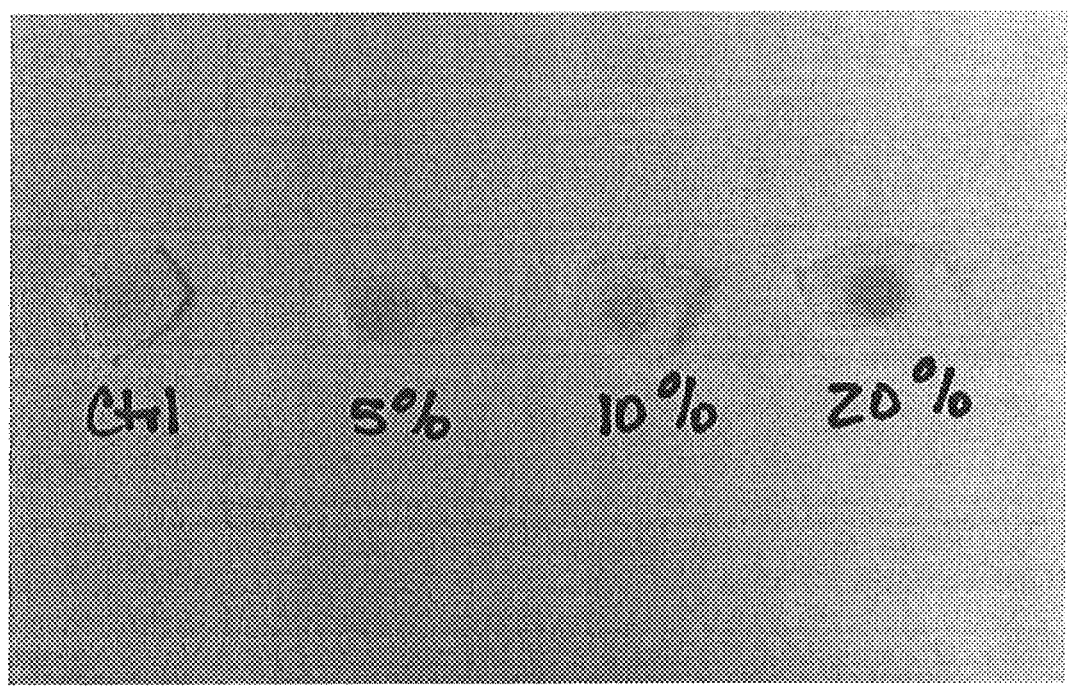
FIG. 3 shows the results of testing of cellulose materials treated with Tollens' reagent for the presence of oxidized cellulose, wherein the cellulose samples comprise 0% ("ctrl"), 5%, 10%, and 20% oxidized cellulose, respectively.

Never dried base furnish samples of 80% hardwood and 20% softwood made at Georgia-Pacific's bleached board mill in Brewton, Ala. were mixed with differing amounts of an oxidized cellulose made according to a process similar to Example 3 and formed into handsheets on a 12"×12" William's sheet mold. The oxidized cellulose was included in amounts of 0%, 5%, 10%, and 20% by weight. The handsheets after forming were pressed and dried on a lab drum dryer. The handsheets were made to a constant basis weight of 260 g/m$^2$. The samples were disintegrated using a small waring blender and 0.20 grams were placed in a Tollen's reagent (2 mL of 0.2M AgNO$_3$ with one drop of 3M NaOH). 2.80% NH$_4$OH was added dropwise until precipitate dissolved. This was diluted to 10 mL with water. The samples were then strained using a 200 mesh sieve and the solution was captured and measured using the spectrophotometer. The absorbance of the samples was measured at 407 nm. The results absorbance measurements is shown in FIG. 2 and reported in Table 13.

TABLE 13

| Sample | Absorbance @ 407 nm |
|---|---|
| Handsheet with ___% oxidized cellulose (37-1) | 0.28 |
| Handsheet with ___% oxidized cellulose (37-2) | 0.42 |

TABLE 13-continued

| Sample | Absorbance @ 407 nm |
|---|---|
| Handsheet with ___% oxidized cellulose (37-3) | 0.71 |
| Handsheet with ___% oxidized cellulose (37-4) | 1.07 |

As reflected in the results shown in FIG. 2 and in Table 13, differences in the sample solutions could be seen following treatment with Tollen's reagent visually, as well as using absorbance measurements, with increasing differences from the control sample with greater amounts of oxidized cellulose incorporated into the sample.

What is claimed is:

1. A packaging material comprising:
an unbleached oxidized softwood kraft cellulose comprising a copper number of at least 1.5 and up to 7, a carboxyl content of at least 3 meq/100 g and up to 15 meq/100 g, a 0.5% capillary CED viscosity of less than 10 mPa·s, and a length-weighted average fiber length of at least 2 mm and up to 3.7 mm.

2. The packaging material of claim 1, wherein the oxidized cellulose comprises a copper number of at least 3.

3. The packaging material of claim 1, wherein the oxidized cellulose comprises a carboxyl content of at least 6 meq/100 g.

4. The packaging material of claim 1, wherein the oxidized cellulose comprises a CED viscosity of less than 7 mPa·s.

5. The packaging material of claim 1, wherein the packaging material is a boxboard, carton, corrugated box, fiberboard, paperboard, liquid packaging board, or cup stock.

6. The packaging material of claim 1, wherein the oxidized cellulose has been oxidized with hydrogen peroxide and a catalyst comprising iron, copper, or both under acidic conditions.

7. The packaging material of claim 6, wherein the oxidized cellulose has an iron content of less than 10 ppm and a copper content of less than 10 ppm.

8. The packaging material of claim 1, wherein the oxidized cellulose absorbs at least 5 ppm and up to 10 ppm ammonia per gram of oxidized cellulose.

9. The packaging material of claim 1, wherein the oxidized cellulose has a bacteriostatic activity after 4 hours of at least 2.5 and up to 3.9 and a bactericidal activity at 4 hours of at least 1.5 and up to 2.3.

10. The packaging material of claim 1, wherein the packaging material is a paper or film.

11. The packaging material of claim 1, wherein the oxidized cellulose is incorporated into the packaging material in an amount of at least 5% weight oxidized cellulose by weight of the packaging material.

12. The packaging material of claim 1, wherein the oxidized cellulose is incorporated into the packaging material in an amount of at least 20% weight oxidized cellulose by weight of the packaging material.

13. The packaging material of claim 1, wherein the oxidized cellulose is incorporated into the packaging material in an amount of at least 50% weight oxidized cellulose by weight of the packaging material.

* * * * *